United States Patent [19]

Kawarabashi et al.

[11] Patent Number: 4,763,773
[45] Date of Patent: Aug. 16, 1988

[54] DOFFED PACKAGE TRANSPORTING APPARATUS

[75] Inventors: Tsukasa Kawarabashi, Kyoto; Shinji Takahashi, Joyo, both of Japan

[73] Assignee: Murata Kikai Kabushiki Kaisha, Kyoto, Japan

[21] Appl. No.: 904,767

[22] Filed: Sep. 5, 1986

Related U.S. Application Data

[63] Continuation of Ser. No. 535,715, Sep. 26, 1983, abandoned.

[30] Foreign Application Priority Data

Sep. 27, 1982 [JP] Japan ................................. 57-169132
Sep. 27, 1982 [JP] Japan ................................. 57-146683

[51] Int. Cl.$^4$ ............................................ B65G 25/00
[52] U.S. Cl. ................................. 198/409; 198/463.3; 198/464.3; 198/464.4; 198/572; 209/586; 242/35.5 A
[58] Field of Search ................... 198/409, 463.3, 464.2, 198/464.3, 464.4, 468.8, 412, 468.6, 572, 575, 577, 817; 242/35.5 A; 414/426, 427, 564, 662, 669, 672, 908, 911; 209/586, 927

[56] References Cited

U.S. PATENT DOCUMENTS

| | | | |
|---|---|---|---|
| 2,415,179 | 2/1947 | Hurley, Jr. ...................... | 209/586 X |
| 2,827,159 | 3/1958 | Peteler . | |
| 3,187,878 | 6/1965 | Harrison et al. .............. | 198/464.2 X |
| 3,365,699 | 1/1968 | Foster ............................ | 209/586 X |
| 3,485,339 | 12/1969 | Miller et al. .................. | 198/577 X |
| 3,519,149 | 7/1970 | Saul ................................ | 209/586 X |
| 3,666,093 | 5/1972 | Thornton et al. ............. | 209/586 |
| 3,871,511 | 3/1975 | Wentz et al. .................. | 198/463.6 X |
| 3,904,050 | 9/1975 | Kimura et al. ................ | 198/468.8 X |
| 3,913,853 | 10/1975 | Raasch ........................... | 242/35.5 A X |
| 4,044,901 | 8/1977 | Tokuno . | |
| 4,066,174 | 1/1978 | Collins et al. .................. | 198/463.3 X |
| 4,109,783 | 8/1978 | Vogt ............................... | 198/781 |
| 4,149,623 | 4/1979 | Nelson . | |
| 4,227,607 | 10/1980 | Malavenda .................... | 198/572 X |
| 4,236,604 | 12/1980 | Warner .......................... | 198/857 X |
| 4,396,335 | 8/1983 | Brandstetter et al. ...... | 242/35.5 A X |
| 4,436,207 | 3/1984 | Klukis ............................ | 209/586 X |
| 4,526,267 | 7/1985 | Harding et al. ................ | 198/409 |
| 4,541,578 | 9/1985 | Kawarabashi et al. ....... | 242/35.5 A |
| 4,565,278 | 1/1986 | Asai et al. ...................... | 242/35.5 A X |

FOREIGN PATENT DOCUMENTS

| | | | |
|---|---|---|---|
| 945138 | 6/1956 | Fed. Rep. of Germany ...... | 198/460 |
| 2507166 | 9/1976 | Fed. Rep. of Germany ...... | 198/409 |
| 1108283 | 1/1956 | France ............................. | 414/672 |
| 138170 | 12/1978 | Japan ............................... | 198/464.2 |
| 54-24587 | 8/1979 | Japan ............................... | 198/409 |
| 132271 | 10/1981 | Japan ............................... | 242/35.5 |
| 58-139979 | 8/1983 | Japan ............................... | 242/35.5 A |
| 468843 | 7/1975 | U.S.S.R. ......................... | 198/409 |

Primary Examiner—Robert J. Spar
Assistant Examiner—Cheryl L. Gastineau
Attorney, Agent, or Firm—Spensley Horn Jubas & Lubitz

[57] ABSTRACT

An apparatus for transporting fully wound packages doffed on and discharged from a spinning frame. The transporting apparatus of the present invention includes a main conveyor, sub conveyor and a lifter, wherein the two conveyors are individually controlled such that a package which is to be transported next by the lifter is always held ready at a predetermined stand-by position. The lifter is able to change the orientation of doffed packages during lifting operation of the package.

6 Claims, 8 Drawing Sheets

DOFFED PACKAGE TRANSPORTING APPARATUS

This is a continuation of application Ser. No. 535,715 filed on Sept. 26, 1983, now abandoned.

BACKGROUND OF THE INVENTION

This invention relates to a method of and apparatus for transporting fully wound packages doffed on and discharged from a spinning frame such as a winder to a subsequent next process or to a warehouse or the like.

In a spinning frame of the type which includes a number of spinning units, packages are normally doffed at different points of time among several spindles of the spinning units. Accordingly, when doffed packages are transported by means of a conveyor or the like, probably they are spaced a different distance from each other on the conveyor, and hence they may be discharged from the conveyor after different intervals of time from each other. Particularly where packages discharged from a conveyor are transported one by one by a lifter or the like, this may cause an unnecessary "wait" at the lifter, or else an interval or spacing between successive packages may be so small that transportation of the packages will be made difficult, or some other undesirable situations may be caused. Thus, losses of time and troubles may be resulted from such situations.

In a spinning mill in which a number of spinning frames are incorporated, packages wound and doffed on the different spinning frames are often in different conditions from each other. For example, packages may be in different orientations to direct their reduced ends in opposite directions while they may have a similar conical configuration, or packages of a similar cheese configuration may have bunch windings at opposite positions. Such variations in orientation of packages will give rise to problems in operations in a subsequent next process, and especially will cause a difficulty in transportation of packages to a subsequent next process.

SUMMARY OF THE INVENTION

The present invention relates to a method of and apparatus for transporting fully wound packages doffed on and discharged from a spinning frame such as a winder having a plurality of winding units to a subsequent process.

An object of the present invention is to provide a method of and apparatus by which a smooth and rapid transportation of doffed packages can be attained.

The present invention contemplates smooth and rapid transportation of doffed packages by dividing a conveyor for conveying doffed packages into two parts including a main conveyor and a sub conveyor wherein the two conveyors are individually controlled such that a package which is to be transported next by a lifter is always held ready at a predetermined stand-by position from which it can be easily received by the lifter.

Furthermore, the present invention contemplates provision of a doffed package transporting lifter which, where packages doffed on spinning frames are being transported one by one by means of an overhead conveyor or the like, can automatically arrange packages into the same orientation during a supplying process of packages to the conveyor.

BRIEF DESCRIPTION OF DRAWINGS

FIG. 2-a and FIG. 2-b are illustrative views showing how a package is discharged from a winder;

FIGS. 9 through 12 are illustrative views showing operations of the lifter of FIG. 7.

DETAILED DESCRIPTION OF THE INVENTION

In the followings, a preferred embodiment of the present invention will be described in detail in reference to the accompanying drawings.

Figure 1:
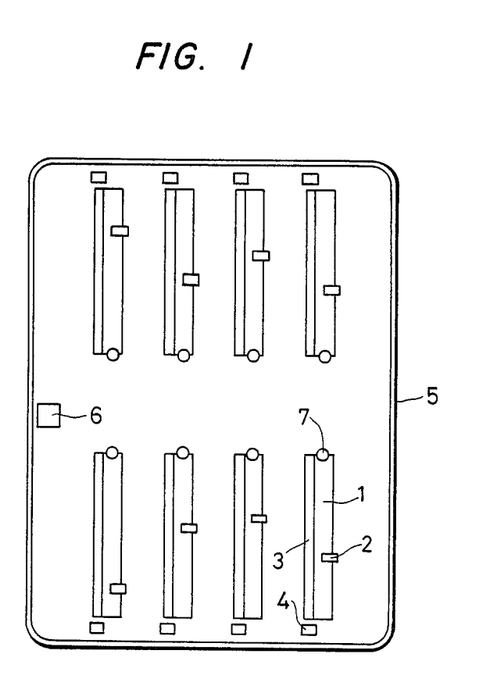
FIG. 1 is a plan view showing a geometry of winders and transporting apparatus in a spinning mill.

Referring to FIG. 1, reference numeral 1 designates a winder, 2 a doffing apparatus which travels along the winder 1, 3 a discharging conveyor for conveying packages doffed by the doffing apparatus 2, 4 a lifter which lifts the thus conveyed packages one by one, 5 an overhead conveyor which is located above a machine bed of the winder 1 and travels among a plurality of the lifters 4, and 6 a package unloading apparatus. Fully wound packages which are doffed at the doffing apparatus 2 in the winder 1 are conveyed on the discharging conveyor 3 and are lifted one by one by the lifter 4 from which they are transferred each onto a hanger of the overhead conveyor 5. The packages are thus conveyed by the overhead conveyor 5 until they are unloaded at a predetermined location from where they are carried to a subsequent next process by means of a truck or the like. Reference numeral 7 designates a cop supplying apparatus which supplies cops to the winder 1.

Figure 2A:
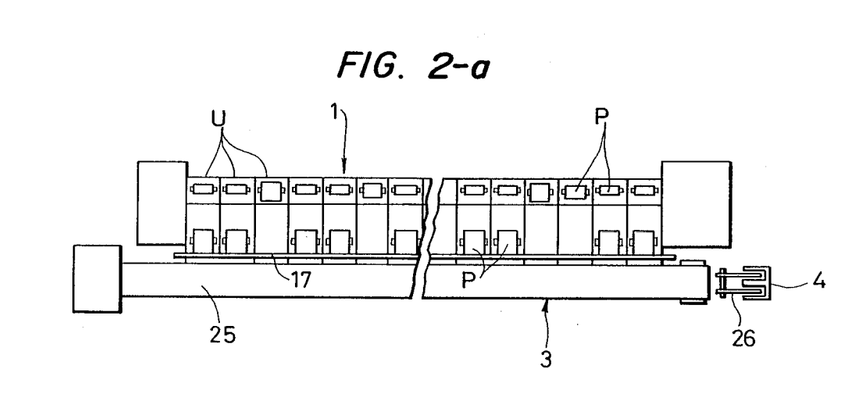
Figure 2B:
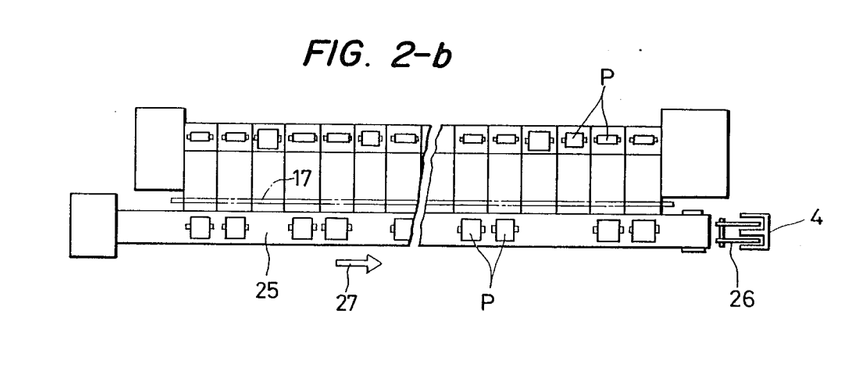
Figure 3:
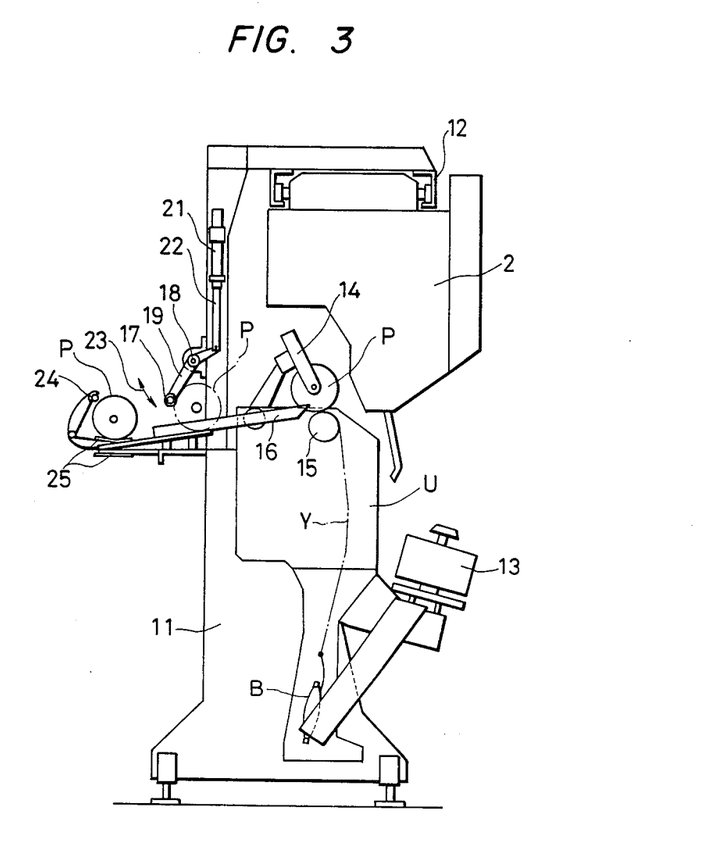
FIG. 3 is a side elevational view of a winder.

FIGS. 2 and 3 show the winder 1 and illustrate how a doffed package is discharged.

The winder 1 includes a number of spinning units U disposed in a row along the length of a machine bed 11, and the doffing apparatus 2 is provided at an upper part of the machine bed 11 and travels along a rail 12 extending along the row of the spinning units U to carry out doffing at the spinning units U. Each spinning unit U has, at a front part thereof, a magazine 13 for storing a plurality of cops B therein. A yarn Y on a cop B dropped and supplied from the magazine 13 is supported on a cradle 14 and is unwound therefrom and wound into a package P which is contacted and rotated by a traversing drum 15. A thus fully wound package P is doffed by the doffing apparatus 2 and is placed on an inclined guide path 16 so that it is rolled until it is stopped at a stand-by position by means of a stopper 17 in the form of a bar. The stopper 17 is secured to an end of an L-shaped arm 19 pivotally supported on the machine bed 11 by means of a pivot 18 and extends along the entire row of the spinning units U. The other end of the arm 19 is connected to a rod 22 of a cylinder 21 secured to the machine bed 11. Thus, actuation of the cylinder 21 will pivot the arm 19 in a direction as shown by an arrow mark 23 about the pivot 18 thereby to release a package P stopped by the stopper 17. The package P thus released is rolled along the inclined surface of the guide path 16 until it is stopped again by a guide bar 24 whereupon it is placed onto a main conveyor 25 of the discharging conveyor 3. The discharging conveyor 3 includes the main conveyor 25 and a sub conveyor 26. The main conveyor 25 extends in the rear of the machine bed 11 along the entire row of the spinning units U while the sub conveyor 26 extends between an end of the main conveyor 25 and the lifter 4.

A cycle of opening and closing operations of the stopper 17 by the cylinder 21 is repeated after each lapse of an interval of time which is rather shorter than an average period of time required to make a package P full. By each cycle of opening and closing operations of the stopper 17, all packages P which are then stopped by the stopper 17 as shown in A in FIG. 2 are released therefrom and discharged onto the main conveyor 25 as seen in B of FIG. 2. The stopper 17 is thereafter returned to its initial position in which it stops subsequently produced packages P.

Figure 4:
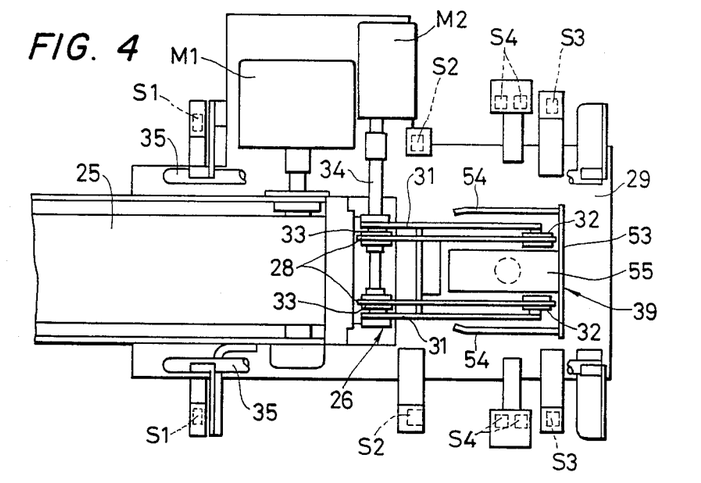
FIG. 4 is a plan view showing an arrangement of a sub conveyor and some components therearound.
Figure 5:
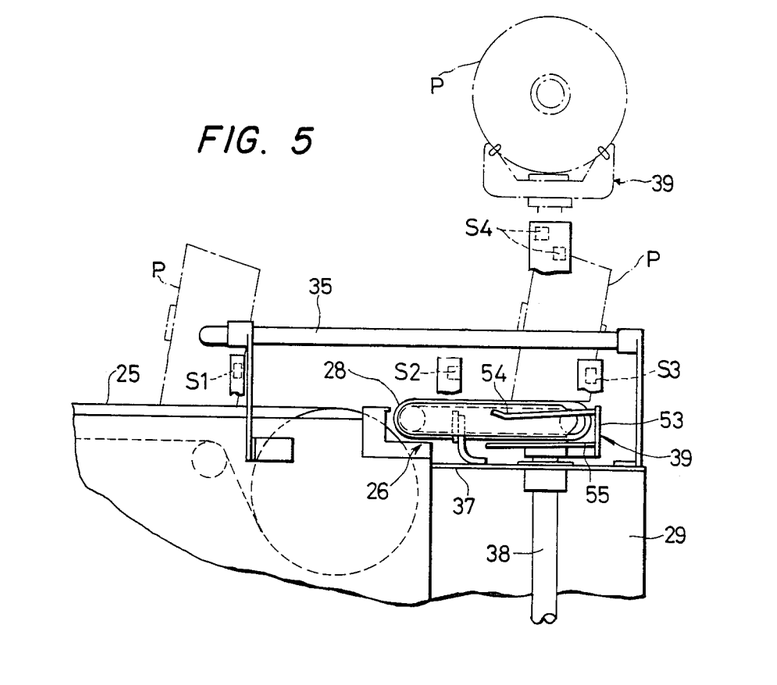
FIG. 5 is a plan view of the arrangement of FIG. 4.
Figure 6:
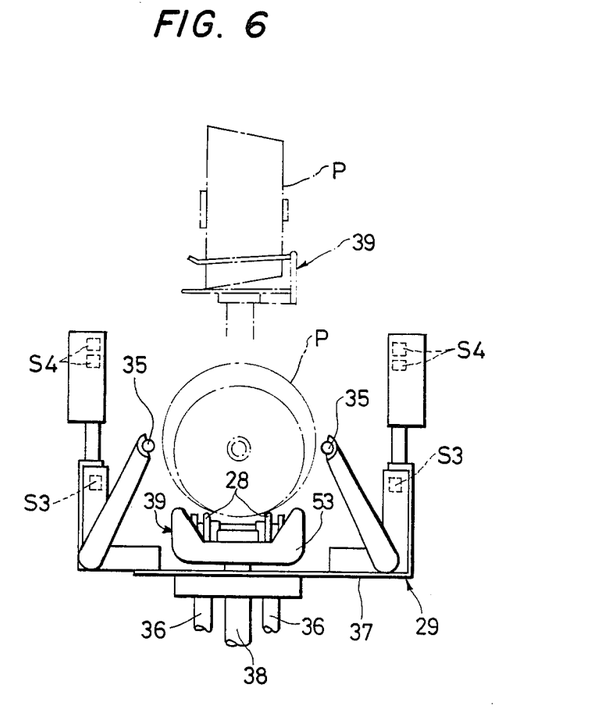
FIG. 6 is a front elevational view of the arrangement of FIG. 4.

The packages P discharged onto the main conveyor 25 are fed on the conveyor 25 in a direction of an arrow 27 FIG. 2(b) and are transferred onto the sub conveyor 26 illustrated in FIGS. 4 to 6. The main conveyor 25 in the form of a wide belt is driven by a first motor M1, and the sub conveyor 26, which is comprised of a pair of less wide endless belts 28, is located adjacent a last end of the main conveyor 25 with their upper surfaces disposed substantially in a common plane. Each of the belts 28 extends between and around pulleys 32 and 33 which are mounted for rotation on a side wall 31 secured to an upper surface of a frame 29, and is driven by a second motor M2 via a shaft 34. Disposed on the frame 29 are a pair of guide rods 35 for guiding a package P along a last end portion of the main conveyor 25 and along the entire length of the sub conveyor 26. A first sensor S1 is uprightly supported adjacent a last end portion of the main conveyor 25 in a spaced relationship from the sub conveyor 26 by a prescribed distance, and a second sensor S2 is similarly supported adjacent a leading end portion of the sub conveyor 26. Further, a third sensor S3 is similarly supported adjacent a last end portion of the sub conveyor 26, and a fourth sensor S4 is similarly supported adjacent the second and third sensors S2 and S3. Each of the first to third sensors S1, S2 and S3 includes a pair of photoelectric detecting switches while the fourth sensor S4 includes two upper and lower pairs of photoelectric detecting switches.

Figure 7:
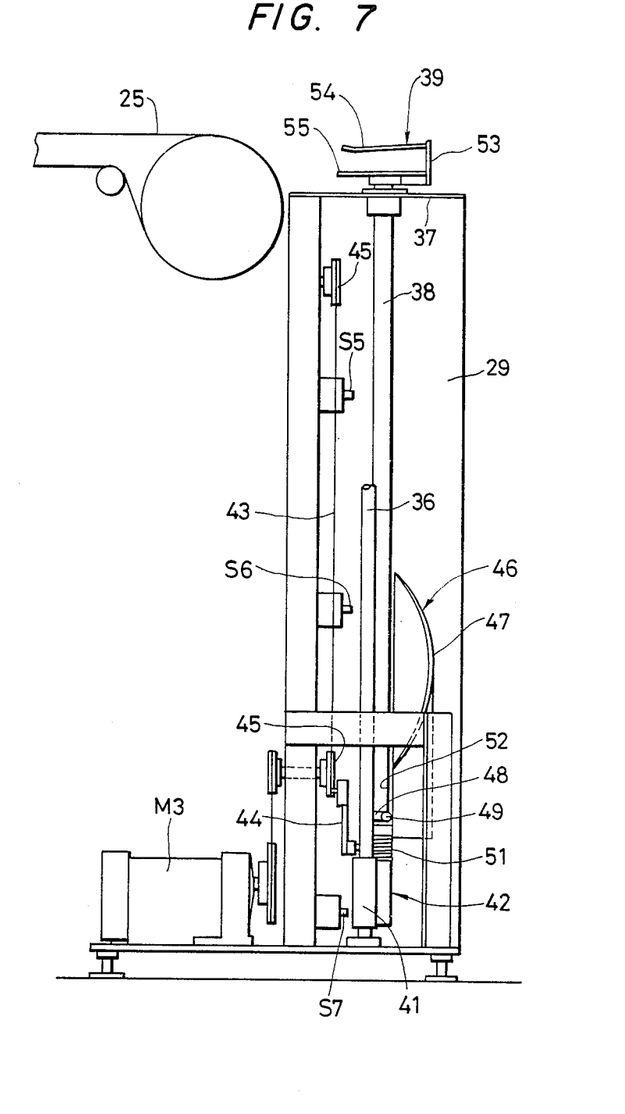
FIG. 7 is a side elevational view of a lifter.
Figure 8:
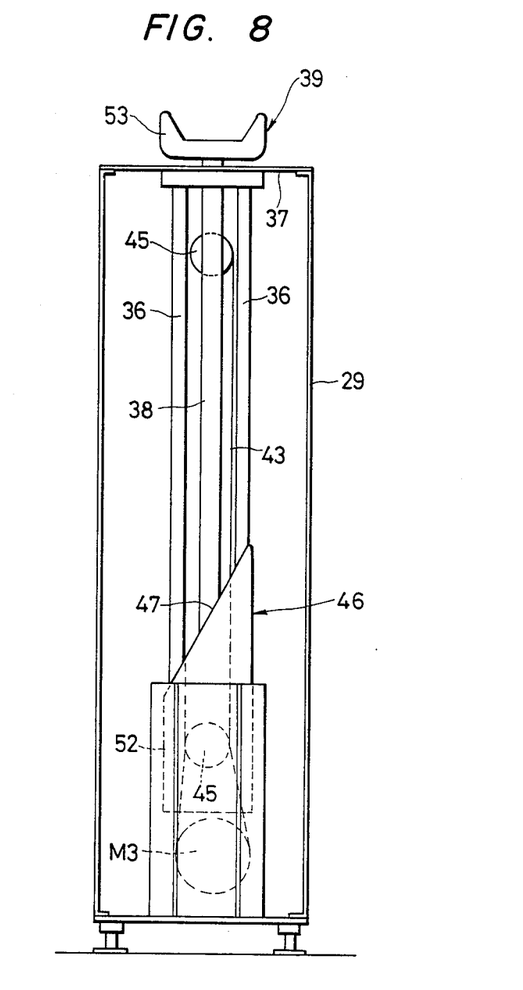
FIG. 8 is a front elevational view of the lifter of FIG. 7.
Figure 9A:
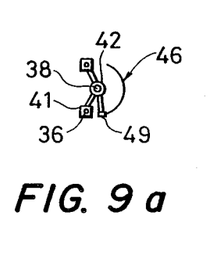
Figure 9B:
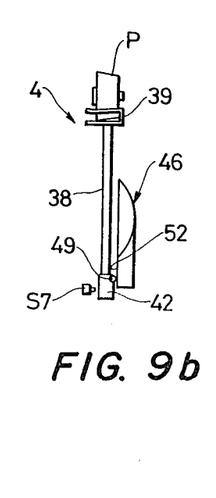
Figure 10A:
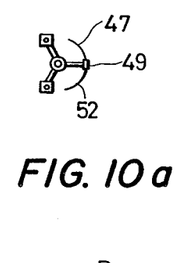
Figure 10B:
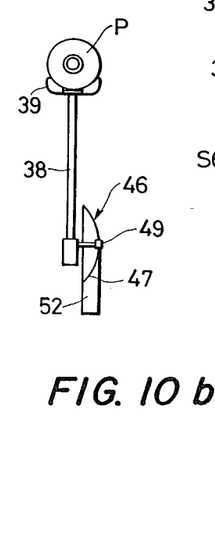
Figures 11A, 11B, 12:
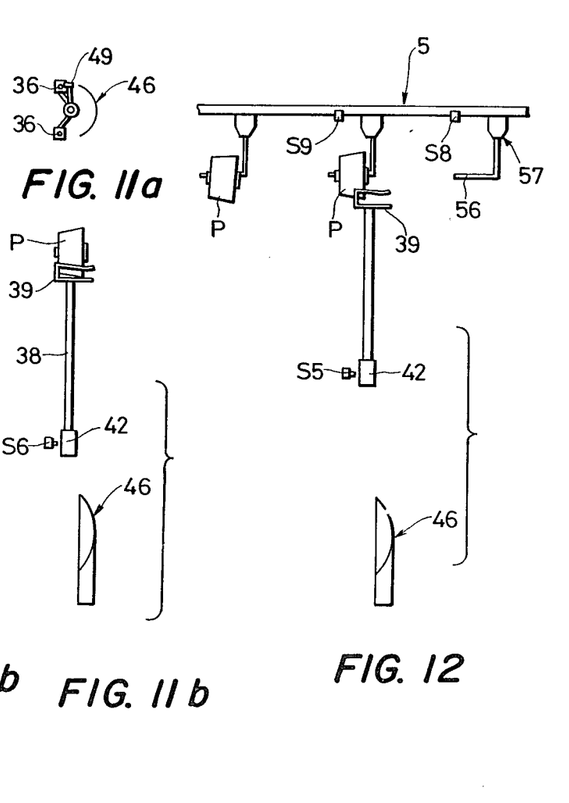

Located below the sub conveyor 26 is the aforementioned lifter 4, details of which are illustrated in FIGS. 7 and 8. The frame 29 which supports the sub conveyor 26 thereon constitutes an outer frame of the lifter 4, and a pair of guide shafts 36 extend vertically in parallel relationship within the outer frame. A main shaft 38 is provided between the guide shafts 36 and extends through a top wall 37 of the frame 29. A stand seat 39 adapted to receive a package P thereon is secured to the top end of the main shaft 38 while a direction changing device 42 having a sliding portion 41 slidably supported on the guide shafts 36 is secured to the bottom end of the main shaft 38. The direction changing device 42 is connected via a connecting member 44 to a portion of an endless chain 43 which extends vertically in the frame 29 and is coupled to be driven by a third motor M3. As a result, if the third motor M3 is energized, the direction changing device 42 is reciprocally moved in upward and downward directions under the guidance of the guide shafts 36. Reference numerals S5, S6 and S7 individually designate sensors secured to the frame 29 for monitoring the lifter 4. These sensors S5, S6 and S7 are disposed in a prescribed spaced relationship from each other such that the fifth sensor S5 may detect the lifter 4 at an uppermost lifted position and the seventh sensor S7 may detect the lifter 4 at a lowermost lowered position while the sixth sensor S6 may detect the lifter 4 at a suitable intermediate position. A direction changing guide 46 having an arch-shaped configuration as viewed in plan is disposed intermediate a lifting path of the lifter 4 and extends arcuately around an axis of the main shaft 38. The direction changing guide 46 has an elliptical inclined guide face 47 formed on the top thereof and is secured at a suitable vertical position to the frame 29. An upper portion of the direction changing device 42 forms a rotary part 48 which is fixed to the main shaft 38 and is slidably turnable in a circumferential direction about the center of the main shaft 38. The rotary part 48 has a cam follower 49 thereon and is urged by means of a spring 51 to turn or rotate around the center of the main shaft 38 to a position in which the cam follower 49 is abutted against a vertical guide face 52 of the direction changing guide 46. The stand seat 39 at the top end of the main shaft 38 is located above the top wall 37 of the frame 29 and has a pair of support arms 54 which extend along opposite sides of the sub conveyor 26 from a back plate 53 thereof. The stand seat 39 further has a bottom plate 55 which is located between and below the two endless belts 28 and is secured to the main shaft 38. In the lowermost lowered position of the lifter 4, the support arms 54 are positioned a little below the top surfaces of the endless belts 28 and may not be contacted at all with the sub conveyor 26 when they are moved up and down.

Now, operations of the sub conveyor 26 and the lifter 4 as described above, that is, a transferring operation of a package P from the main conveyor 25 to the sub conveyor 26 and a lifting operation of the package P by the lifter 4, will be described with reference to FIGS. 5 and 9 through 12.

At first, doffed and fully wound packages P are discharged in random relationship onto the main conveyor 25 as has been described above in connection with A and B of FIG. 2 and are sequentially conveyed thereby toward the sub conveyor 26. The main conveyor 25 and the sub conveyor 26 are initially started at the same time with discharging of a package P resulting from opening and closing of the stopper 17, and a first forwardmost package P which has been conveyed on the main conveyor 25 is first transferred onto the sub conveyor 26 which thus feed the first package P as in the rightward direction in FIG. 4. The first sensor S1 thereupon detects passage of the first package P but no action is taken. However, the second sensor S2 then detects initiation of a transferring operation of the first package P onto the sub conveyor 26 and the main conveyor 25 to immediately stop running. The distance between the first and second sensors S1 and S2 is selected to be shorter than the distance between two packages P from adjacent two spinning units U in the winder 1, and accordingly, at this instant, a next second forwardmost package P is never positioned rightwardly of the first sensor S1; this is shown in FIG. 5. The first package P is further advanced on the sub conveyor 26 and arrives at the last end of the same whereupon it is detected by the third sensor S3. Upon such detection, running of the sub conveyor 26 is stopped while running of the main conveyor 25 is started again and at the same time the fourth sensor S4 is rendered operative. The fourth sensor S4 is constituted such that it determines an excessively wound package P if light radiations from upper and lower light emitting elements thereof are both intercepted by the package P whereas it determines an insufficiently wound package P if neither of such light radiations is intercepted by the package P. Thus, based on such determination of the fourth sensor S4, it is decided whether or not transportation of the package P by the lifter 4 is acceptable. If excessive or insufficient winding is determined, a red lamp not shown is automatically lit to inform an operator of it in order to demand removal of the unacceptable package P in a stopped condition of the system without progressing to a subsequent next operation. Such judgment as described above is necessary to prevent a vertical dislocation or displacement of the position of a core pipe of the package on the lifter 4 due to excessive or insufficient windings of a yarn of the package as will be described later herein, in order to eliminate any problem from arising during a transferring operation of a package to the overhead conveyor 5 as will also be described later herein. If the operator has removed such an unacceptable package and turns on a switch not shown, then the operation of the system is resumed. In this second cycle, the second package P is now regarded as the first forwardmost package P, and such a sequence of package conveying and judging operations as described above is repeated for this package P. While removal of a package P is waited since the first forwardmost package P has been determined to be an excessive or insufficient package by the fourth sensor S4, only the main conveyor 25 is continued to run until the second package P is detected by the first sensor S1. Accordingly, after the switch has been thrown in by an operator to resume the operation of the system as described above, the second package P which has been in a stand-by condition adjacent the first sensor S1 now becomes the first forwardmost package since then and will be transferred onto the sub conveyor 26 in a very short period of time.

The first forwardmost package P which has been determined as acceptable by the fourth sensor S4 is then lifted by the lifter 4 in the order as shown by FIGS. 9 through 12 and is transferred onto the overhead conveyor 5. In particular, at the same time with confirmation that the package P intercepts only the light radiation to the lower element of the fourth sensor S4, the third motor M3 located at a lower portion of the lifter 4 is energized to drive the chain 43 to travel along its path. The direction changing device 42 connected to the chain 43 thereby begins to move up together with the main shaft 38. At an initial part of such an upward movement, the cam follower 49 is held in contact with the vertical guide face 52 of the direction changing guide 46 as seen in FIGS. 9(a) and 9(b), and as a result, the main shaft 38 is lifted without effecting rotation so as to transfer the package P on the sub conveyor 26 to the stand seat 39. The support arms 54 and the bottom plate 55 of the stand seat 39 are both inclined in conformity with a cone-shaped configuration of the package P so that the package P is supported at a side thereof on the support arms 54 while a lower portion thereof is supported on the bottom plate 55. Thus, the package P is lifted with a core pipe thereof directed in horizontal direction as viewed in a side elevation thereof. As the lifter 4 is further lifted, the cam follower 49 is disengaged from the vertical guide face 52 at a particular point and is contacted with and guided by the inclined guide face 47 so that the main shaft 38 is gradually rotated about its axis to change the direction of the package P on the stand seat 39 as seen in FIGS. 10(a) and 10(b). As the lifter 4 is lifted still further, the roller 49 is again disengaged from the inclined guide face 47 and is contacted with and thereafter guided by a side face of one of the guide shafts 36 so that the main shaft 38 is lifted again without effecting rotation. This condition is illustrated in FIGS. 11(a) and 11(b), and now, the package P on the stand seat 39 is directed in a different direction by 180 degrees from its initial position and is directly below the overhead conveyor 5. When the package P comes to a position spaced a preselected distance from the overhead conveyor 5, the aforementioned sensor S6 within the lifter 4 detects the direction changing device 42 and causes the lifting motion of the lifter 4 to stop at once. The overhead conveyor 5 has a plurality of hangers 57 with an L-shaped peg 56 depending therefrom and disposed in a predetermined spaced relationship from each other, and the hangers 57 are then advancing as in the leftward direction in FIG. 12. An eighth sensor S8 and a ninth sensor S9 are provided forwardly and rearwardly of the lifter 4, respectively, on the overhead conveyor 5 for detecting hanger 57 passing thereby. A yet further sensor not shown detects whether there is present a package P on a hanger 57 which passes by the eighth sensor S8. If passage of a hanger 57 is detected by the eighth sensor S8 and it is confirmed that the hanger 57 is empty, the lifter 4 which has been stopped so far simultaneously resumes its lifting motion. Then, the lifter 4 is again stopped at its uppermost position by operation of the fifth sensor S5. In this condition, the empty hanger 57 passes over the stand seat 39, and thereupon, it inserts the peg 56 thereof into a core pipe of a package P on the stand seat 39 and carries the package P away. If operation of the fifth sensor S5 and detection of passage of a hanger 57 by the ninth sensor S9 are both confirmed, the lifter 4 moves down at a stretch to the initial lowermost position as shown in FIG. 9(b) while turning its direction and is stopped there when it is detected by the seventh sensor S7. Upon such detection by the seventh sensor, the main conveyor 25 and the sub conveyor 26 which have been in stopped condition so far are restarted. As a result, the package P which has been held stopped adjacent the first sensor S1 is transferred onto the sub conveyor 26 as the first forwardmost package P and is then transported by way of the lifter 4 to the overhead conveyor 5 in a similar sequence of operations to that as described above. It is to be noted that, if the second package P has not yet been detected by the first sensor S1 when the seventh sensor S7 detects that the lifter 4 is moved down to the lowermost position, the main conveyor 25 is then still in operation, and hence detection of the lifter 4 by the seventh sensor S7 will not lead to restarting of the main conveyor 25. Packages P discharged onto the main conveyor 25 are transported one by one in a manner as described above, and if no subsequent package P is detected even after lapse of a predetermined period of time after a package P was detected by the first sensor S1, it is determined that all of packages P on the main conveyor 25 have been transported therefrom, and accordingly, operation of the main conveyor 25, the sub conveyor 26 and so on is stopped. Then, in response to subsequent releasing of the aforementioned stopper 17, they are rendered operative again.

According to the apparatus of the present invention as described above, firstly, since a second package P is already in a predetermined stand-by position during operation of the lifter 4, the lifter 4 can continue to operate with little waiting time, resulting in considerable reduction of the entire transportation time. Secondly, since the first forwardmost package P is lifted by the lifter 4 after it has been conveyed by the main conveyor 25 and then by the sub conveyor 26, it does not interfere with the second package P when the first forward most package is lifted by the lifter 4. Thirdly, since the lifter 4 is stopped once during an upward movement thereof and thereafter it is moved up again and then moved down in timed relationship with an advancing movement of the overhead conveyor 5, it does not interfere, when the package P is transferred to a hanger 57, with a forward or rearward adjacent hanger 57. Fourthly, since the lifter 4 is rotated until a proper orientation is reached in which a package P can be easily fitted to the peg 56 of the overhead conveyor 5 and besides such rotation is effected during a lifting movement thereof, the package P can be transported smoothly and rapidly.

It is to be noted that, where the distance between packages P from adjacent winding units U is greater than shown given winders 1, the second sensor S2 may be omitted and simultaneously the apparatus may be modified such that the main conveyor 25 is stopped only when the first sensor S1 detects a second package P after the first forwardmost package P has been detected by the third sensor S3.

As apparent from the foregoing description, according to the present invention, there is little waiting time necessary when packages doffed on and randomly discharged from a winder are transported one by one, and hence, packages can be transported successively to regularize supply of packages to a subsequent next process, thereby contributing to improvement of the rate of operation of the entire spinning mill. Furthermore, according to the present invention, orientation of doffed packages can be easily changed during a process of transportation thereof, facilitating transportation thereof by an overhead conveyor or the like. Further, since lifting and orientation changing operations of a package are performed at the same time, the lifter according to the invention has an advantage of a reduced loss in time.

What is claimed is:

1. An apparatus for transporting and lifting doffed packages doffed on and discharged from a spinning frame, comprising:
    a main conveyor for conveying packages doffed on and discharged from a spinning frame,
    a sub conveyor onto which the packages conveyed by said main conveyor are transferred,
    a following package sensor for detecting a following package conveyed by said main conveyor to stop the running of said main conveyor when a forwardmost package is present on the sub conveyor, located at a position spaced a prescribed distance from said hub conveyor over said main conveyor such that no two packages are present on the sub conveyor at the same time,
    a sub conveyor package sensor, located over said sub conveyor, for detecting a forwardmost package,
    a lifter, operable to raise the forwardmost package after detection of the forwardmost package by said second sensor, for lifting and transporting the forwardmost package on said sub conveyor, and
    a lift completion sensor for monitoring operation of said lifter to detect completion of a lifting and transporting operation for the forwardmost package;
    wherein said lifter comprises a lifting apparatus having at one end thereof a stand seat for receiving a package thereon and having at the opposite end thereof a direction changing device including a cam follower urged to be rotated in a horizontal direction, a driving device for driving said lifting apparatus to move up and down, and a direction changing guide disposed for contact with said cam follower during the up and down movements of said lifting apparatus to rotate said seat a predetermined angle; and
    wherein said lifting apparatus includes a main shaft having at one end thereof the stand seat and having at the lower end thereof the direction changing device and two guide shafts arranged parallel to the main shaft, a sliding portion of said direction changing device being slidably supported on the guide shafts.

2. An apparatus as claimed in claim 1, wherein said driving device comprises an endless chain which extends vertically along the guide shaft and is connected to the direction changing device and a motor coupled to drive the endless chain so that the direction changing device is reciprocally moved in the upward and downward directions under the guidance of the guide shafts.

3. An apparatus as claimed in claim 2, wherein an upper portion of the direction changing device forms a rotary part which is fixed to the main shaft and is slidably turnable about the axis of the main shaft and the rotary part has the cam follower thereon and is urged by means of a spring to turn to a position in which the cam follower is abutted against a guide face of the direction changing device.

4. An apparatus as claimed in claim 3, wherein said direction changing device has an elliptical inclined guide face formed on the top thereof and is disposed intermediate a lifting path of the lifter and extends arcuately around the main shaft.

5. An apparatus as claimed in claim 1, wherein said stand seat comprises a pair of support arms which extends along opposite sides of the sub conveyor from a back plate thereof and a bottom plate which is located between and below the two endless belts and is secured to the main shaft.

6. An apparatus for transporting and lifting doffed yarn packages doffed on and discharged from a spinning frame, comprising:
    a main conveyor for conveying packages doffed on and discharged from a spinning frame;
    a sub conveyor onto which the packages conveyed by the main conveyor are transferred;
    following package sensor control means for detecting, after a leading package has passed on to the sub conveyor, the presence of a following package on the main conveyor at a predetermined distance from the sub conveyor and for controlling stopping of the main conveyor to maintain said distance, where the distance is selected such that the leading package and following package are not present on the sub conveyor at the same time;
    sub conveyor package sensor control means for detecting the leading package at the end of the sub conveyor;

a lifter for lifting and transporting the leading package in response to the detection of the leading package by the sub conveyor package sensor control means;

lift completion sensor control means for detecting completion of the lifter operation and for controlling the restarting of the main conveyor in response thereto;

sub conveyor transport sensor control means for detecting the transportation of a leading package from the main conveyor to the sub conveyor and for stopping the main conveyor in response thereto, wherein the sub conveyor package sensor control means controls restart of the main conveyor on detecting the leading package at the end of the sub conveyor; and acceptable package sensor control means for determining whether the leading package on the sub conveyor is between a predetermined maximum and minimum size, said acceptable package sensor control means including upper and lower pairs of photoelectric detecting sensors arranged such that the light path of both pairs is intercepted if a package is excessively wound, while the light path of neither pair is intercepted if the package is insufficiently wound, the package otherwise being of an acceptable size for transportation by the lifter.

* * * * *